US007886587B2

(12) United States Patent
Moritz et al.

(10) Patent No.: US 7,886,587 B2
(45) Date of Patent: Feb. 15, 2011

(54) METHOD AND DEVICE FOR DETECTING THE EXCHANGE OF SHEATHED-ELEMENT GLOW PLUGS IN A COMBUSTION ENGINE

(75) Inventors: Rainer Moritz, Filderstadt (DE); Wolfgang Dressler, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 12/331,190

(22) Filed: Dec. 9, 2008

(65) Prior Publication Data

US 2009/0193882 A1 Aug. 6, 2009

(30) Foreign Application Priority Data

Feb. 4, 2008 (DE) ....................... 10 2008 007 398

(51) Int. Cl.
*G01M 15/04* (2006.01)

(52) U.S. Cl. ................................................... 73/114.62

(58) Field of Classification Search ............... 73/114.62
See application file for complete search history.

(56) References Cited

U.S. PATENT DOCUMENTS 4,598,676 A * 7/1986 Ito et al. ................. 123/145 A
4,858,576 A * 8/1989 Jeffries et al. ........... 123/145 A
5,307,701 A * 5/1994 Thonnard ..................... 74/7 E
6,009,369 A * 12/1999 Boisvert et al. ............... 701/99
6,635,851 B2 * 10/2003 Uhl ............................ 219/270
7,171,846 B2 * 2/2007 Sakamoto et al. ........ 73/114.18
7,234,430 B2 * 6/2007 Toedter et al. ........... 123/179.6
7,431,004 B2 * 10/2008 Kernwein et al. ....... 123/145 A
7,730,864 B2 * 6/2010 Toedter et al. .......... 123/145 A
2007/0056545 A1 * 3/2007 Kernwein et al. ....... 123/145 A
2008/0319631 A1 * 12/2008 Kernwein et al. ........... 701/102

* cited by examiner

*Primary Examiner*—Freddie Kirkland, III
(74) *Attorney, Agent, or Firm*—Kenyon & Kenyon LLP

(57) ABSTRACT

A method and a device for detecting the exchange of sheathed-element glow plugs (GPE) in a combustion engine, in which at least one electric characteristic quantity of at least one glow plug is measured at the beginning of a driving cycle, an instantaneous value of this characteristic quantity is determined and compared to at least one stored value of the same electric variable quantity of this glow plug, which was determined at the beginning of at least one preceding driving cycle, and if the deviation of the instantaneous value from the stored value exceeds a specifiable threshold value, an exchange of the glow plug (GPE) will be inferred.

25 Claims, 1 Drawing Sheet

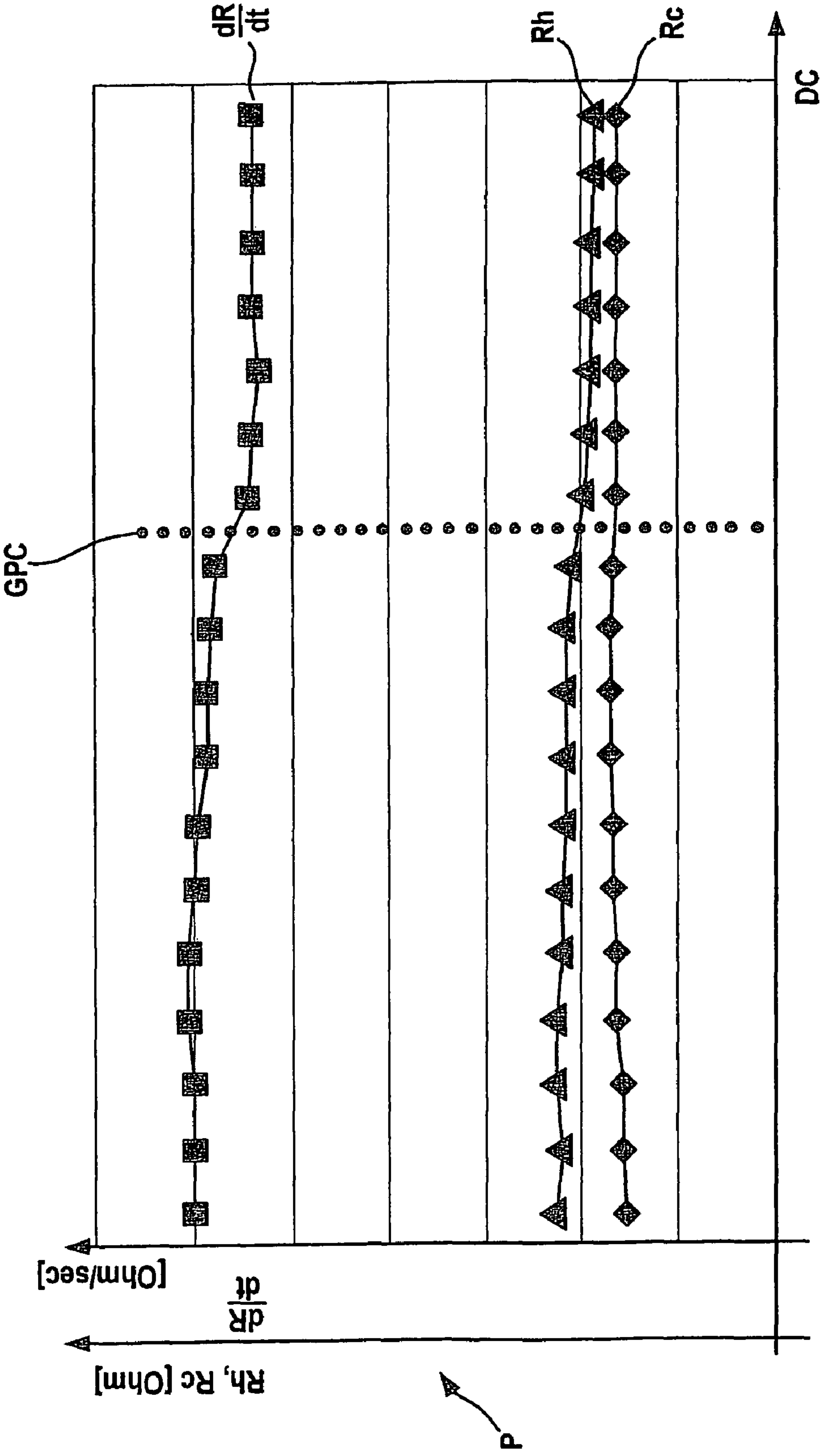
dR/dt
Rh
Rc
DC
GPC
dR/dt [Ohm/sec]
Rh, Rc [Ohm]
P

METHOD AND DEVICE FOR DETECTING THE EXCHANGE OF SHEATHED-ELEMENT GLOW PLUGS IN A COMBUSTION ENGINE

FIELD OF THE INVENTION

The present invention relates to a method for detecting the exchange of sheathed-element glow plugs in a combustion engine, the use of this method, and a corresponding device.

BACKGROUND INFORMATION

The functions of temperature regulation (closed-loop control) aging compensation of glow plugs as well as malfunction prediction of glow plugs require knowledge of when the glow plug was exchanged. The obvious possibility of indicating an exchange of glow plugs to the control device is available via a standard diagnosis tester. Such a device is used by a service station employee to notify the system via a diagnosis interface whether and, if so, which glow plug was exchanged. However, some customers do not accept this approach because it constitutes an additional error source, which offers a questionable fallback level or a questionable safety concept. More specifically, in case of an incorrect entry, it is unclear what will happen to the functions that rely on this variable.

SUMMARY OF THE INVENTION

It is an object of the exemplary embodiments and/or exemplary methods of the present invention to provide a method which makes it possible to detect the exchange of sheathed-element glow plugs in a combustion engine in an uncomplicated, rapid and reliable manner, without human intervention, and which is also easily implementable and cost-effective. Furthermore, it is the object of the exemplary embodiments and/or exemplary methods of the present invention to provide a corresponding device.

For one, this object is achieved by a method in which at least one electric characteristic quantity of at least one glow plug is measured at the beginning of a driving cycle, an instantaneous value of this characteristic quantity is determined and compared to at least one stored value of the same electric characteristic quantity of this glow plug, which had been determined at the start of at least one preceding driving cycle, and from which an exchange of the glow plug will then be inferred if the deviation of the instantaneous value from the stored value exceeds a specifiable threshold value.

One aspect of the exemplary embodiments and/or exemplary methods of the present invention is the automatic detection of an exchange of a glow plug at the start of a driving cycle without the use of input devices, i.e., without human error source.

Exemplary refinements of the method according to the present invention are described herein.

BRIEF DESCRIPTION OF THE DRAWING

The FIGURE shows a diagram with a characteristic of measured values of electric characteristic quantities P of a sheathed-element glow plug as a function of driving cycles DC.

DETAILED DESCRIPTION

In one advantageous specific embodiment, to determine a deviation of the instantaneous value from the stored value, the amount of the change in the values is related to an absolute value. Such a reference allows an especially reliable detection of a glow plug exchange since a possibly normal deviation, which could be due to signs of aging of a glow plug, is qualified.

This reliability may be increased further if the value of the at least one electric characteristic quantity is formed from a glow plug vector which includes the at least one electric characteristic quantity. Thus, a plurality of characteristic quantities is subjected to a joint analysis, so that all possible deviations of a glow plug are taken into account.

In another advantageous specific embodiment, values of electric characteristic quantities are stored across driving cycles, and an exchange of glow plugs is detected on the basis of a discontinuity of the instantaneous value with respect to the stored value characteristic. This makes it possible to compare instantaneous deviations to a history, so that a natural aging progression of the glow plug may be ignored.

The aforementioned discontinuity or the abrupt change of an instantaneous value with respect to the historic pattern of the stored values is most reliably detectable when temporal changes are derived from these values and the exchange of a glow plug is inferred from a discontinuity of an instantaneous change in value as compared to the historical change pattern.

Electric characteristic quantities may include a cold resistance, a hot resistance, and/or a change in resistance. On the one hand, a change in these values is a reliable indication of a glow plug exchange. At the same time, these values are relatively easy to measure and are normally already monitored in a control of a sheathed-element glow plug.

In the method according to the present invention, an especially reliable detection of a glow plug exchange is implementable in particular if a comparison of values of electric variables takes place only when identical operating states of the combustion engine are present.

The operating states may include a cooling water temperature, an injection quantity, an engine speed, and/or an energy-load state of the glow plugs. These values are usually detected in an engine control device and may be picked off there.

The storage requirement for values of electric characteristic quantities is able to be reduced if an exchange of all glow plugs is inferred from the deviation of the measured value from the stored value of a sheathed-element glow plug. Thus, only the value characteristic of one glow plug must be recorded, and from that point on, a smaller memory than for accommodating the values of all glow plugs may then be provided.

The method according to the present invention may be used for aging compensation and/or temperature regulation of sheathed-element glow plugs in a combustion engine.

The aforementioned objective is also achieved by a device, which includes a measuring unit for measuring at least one electric characteristic quantity of at least one sheathed-element glow plug; a memory unit for storing at least one value of the at least one electric characteristic quantity; and a detection unit, which is designed to determine an instantaneous value of the electric characteristic quantities of a glow plug, to compare this instantaneous value to at least one stored value of the same electric characteristic quantity of this glow plug, and to detect a glow plug exchange if the deviation of the instantaneous value from the stored value exceeds a specifiable threshold value.

One aspect of the exemplary embodiments and/or exemplary methods of the present invention is that it allows the automatic detection of a glow plug exchange without human error sources. As a rule, the measuring and memory units are already part of a control unit for the engine or sheathed-element glow plugs. The values of electric characteristic quantities of plugs detected there are easily accessible to the detection unit. The comparison and detection functions of the exemplary embodiments and/or exemplary methods of the present invention of the latter unit are able to be realized in an especially simple and cost-effective manner in the form of software, firm ware or hardware and, as such, either separately from or as integral part of the already provided controls.

Exemplary refinements of the device according to the present invention are described herein.

In one exemplary further development of the present invention, the memory unit is designed to store values of electric characteristic quantities across driving cycles, and the detection unit is designed to detect a discontinuity of the instantaneous value with respect to the stored value characteristic, upon which a plug exchange is detected. In this way an abrupt change of an instantaneous value from its historic characteristic is more easily detectable, so that natural aging manifestations of a spark plug will be ignored.

In this context it may especially be that if the detection unit is designed to derive variations over time from the stored values of electric characteristic quantities and to detect a discontinuity of an instantaneous value change with respect to the historic change characteristic, upon which a glow plug exchange is detected. The aforementioned discontinuity or the abrupt change of an instantaneous value from the historic characteristic of the stored values is able to be detected more reliably on the basis of this time derivation.

An especially reliable detection of a spark plug exchange can be expected if the detection unit is specifically designed to detect operating states of the combustion engine and to compare instantaneous values of electric characteristic quantities with stored values of electric characteristic quantities under the same operating states of the engine.

Exemplary realizations of the device according to the present invention provide that it is implemented as an integral part together with an engine control or a control of a sheathed-element glow plug, or that it is connected to one of these controls via an interface. This reduces the number of required functional elements and also the necessary space, which likewise results in lower expense.

In the following text the method according to the present invention is explained with the aid of a FIGURE that shows a diagram with a characteristic of measured values of electric characteristic quantities P of a sheathed-element glow plug as a function of driving cycles DC. By way of example, a vector (hereinafter: plug vector) of at least one and maximally three variables of resistance cool RC, resistance hot RH, and change in resistance dR/dt in the transition from cold to hot is stored in a non-volatile memory such as a circulating memory.

In the first measurement into the empty memory, it is assumed that all plugs are new. Monitored are the absolute values of the plug vector. They are compared to threshold values and determine a plug malfunction or also a plug type.

The plug type, the tolerance chain of the measuring equipment, the production variances of the plugs and their aging behavior are the determining factors for the number of plug vector components and for which parameters are measured and stored. For instance, if the production variance and the aging variance are without correlation (R=0), but both lie within a range that corresponds to the tolerance of the measuring equipment, then abrupt changes in measured values are not clearly assignable. They may stem from tolerances of the measuring equipment, a glow plug exchange, or aging. Such a variable will then not be suitable as parameter of the plug vector. However, the suitability may also change across batches of the plug production of the particular type of plug. Therefore, it is recommended that all three variables be taken into account in the plug vector. However, this is not a requirement.

When measuring the characteristic quantities of the plug vector, the changes in the absolute values, i.e., the first time derivation, are measured or formed as well. They are compared to threshold values. If tests for aging of the plugs show an exponentially shaped characteristic of the values of the plug vector with aging, then the second time derivation may additionally be measured or formed as well and compared to threshold values.

The advantage of the first derivation is the possibility of detecting a jump in the chain of the measured plug vector values. For example, if a jump occurs in the value, then the first derivation of the corresponding value rises or drops considerably, depending on the operational sign, and is detectable by comparing the first derivation with a threshold value, i.e., Abs (dRc/dt)<=threshold value (dRc/dt), for example.

The advantage of the second time derivation is the adaptability of the just described measurement or the formation of the first derivation. In other words, a glow plug exchange is to be inferred only if the change in a plug vector value occurs abruptly. In the case of sporadically occurring sudden increases in measured value variations, i.e., in changes in a glow plug vector value that increase in points but then return to a nearly constant state later on, the second time derivation can prevent that the malfunction detection of the first derivation detects this glow plug as not exchanged.

In the attached drawing, a glow plug exchange GPE is particularly easy to infer from the abrupt characteristic of the first time derivation dR/dt of a resistance value, while the resistance values Rc and Rh do not exhibit any jumps that are noticeable at first glance.

In this context, it may depend on the type of glow plug whether all values or only one or two are sampled or calculated of the variables of absolute value, first derivation and second derivation. The second derivation, for instance, may be used for glow plugs that exhibit this specific aging pattern. However, as the case may be, it could also be necessary to use all three variables since the aging behavior likewise accelerates sporadically or intermittently in comparison with a continuous behavior and, furthermore, may also vary in future production batches.

Rc and dR/dt are measured once per driving cycle. Rh may be measured once or multiple times. An especially meaningful measurement is obtained if the system's marginal conditions, e.g., the cooling water temperature, the injection quantity, the rotational speed and/or the energy loading of the glow plug are comparable in all measurements. This can be ensured in a variety of ways.

For one, a sheathed-element glow plug control device may receive the characteristic quantities of cooling water temperature, injection quantity, rotational speed, and/or energy loading of the glow plug from the engine control device for the purpose of comparing the measuring environment of the measured glow plug vector and the possibly calculated derivations. If one of the values is not within a tolerance range, then the glow plug vector variable measured at this instant will be discarded. However, the comparison may also take place at the engine control. It must then be ensured that the control is aware of the measuring instants since the start of driving cycle DC, for instance by messages or timers, or by providing an appropriate broad-band interface between the engine control and glow plug control.

For reasons of rationalization, it is useful to reduce the required memory by storing only one rather than all glow plug vectors. However, in so doing, it must be ensured, by diagnosis displays or instructions and/or documentation, that a glow plug exchange will always affect all glow plugs.

In summary, the method according to the present invention thus stores at least one of three characteristic glow plug variables, and at the beginning of each driving cycle compares at least one of these three variables to the last measurement and/or the last change in the variables, i.e., the difference is formed between the next-to-last measurement and the last measurement. This includes the possibility of examining the first and/or the second time derivation of these variables and to provide them with threshold values to be adapted appropriately.

In this context it is assumed that each glow plug is unambiguously defined by at least one of the three variables of cold resistance, hot resistance, and change in resistance in the transition from cold to hot. Furthermore, it is assumed that the aging behavior of the glow plugs indicates only continuous variations in the three mentioned variables, i.e., the changes are small from one driving cycle to the next in comparison with the absolute value. Furthermore, it is assumed that each glow plug exchange creates an unusual jump in the historic characteristic of these variables. The method detects this jump and indicates a glow plug exchange to the system.

Subsequent functions, such as the resetting of the glow-duration counter, evaluation of the measured values such as Rc and Rh as stemming from a new and thus factory-checked glow plug, or the resetting of correction factors such as an aging correction, are implementable in response.

What is claimed is:

1. A method for detecting an exchange of glow plugs (GPE) in a combustion engine, the method comprising:

measuring at least one electric characteristic quantity of a glow plug at a beginning of a driving cycle;

determining an instantaneous value of the at least one electric characteristic quantity;

determining a time deviation of the at least one electric characteristic quantity by comparing the instantaneous value to at least one stored value of the same at least one electric characteristic quantity of the glow plug, the stored value having been determined at a start of at least one preceding driving cycle; and if the time deviation of the instantaneous value from the stored value exceeds a specifiable threshold value, inferring an exchange of the glow plug.

2. The method of claim 1, wherein, to determine the time deviation of the instantaneous value from the stored value, the amount-wise change in the values is related to an absolute value.

3. The method of claim 1, wherein the value for the at least one electric characteristic quantity is formed from a glow plug vector, which includes the at least one electric characteristic quantity.

4. The method of claim 1, wherein values of electric characteristic quantities are stored across driving cycles, and a glow plug exchange (GPE) is inferred from a discontinuity of the instantaneous value with respect to the stored value characteristic.

5. The method of claim 4, wherein temporal changes are derived from the stored values of electric characteristic quantities, and a glow plug exchange (GPE) is inferred from a discontinuity of an instantaneous value change and an historic change characteristic.

6. The method of claim 1, wherein the electric characteristic quantities include at least one of a cold resistance, a hot resistance, and a change in resistance.

7. The method of claim 1, wherein a comparison of values of electric characteristic quantities takes place only if identical operating states of the combustion engine are present.

8. The method of claim 7, wherein the operating states include at least one of a cooling water temperature, an injection quantity, a rotational speed, and an energy loading of the sheathed-element glow plugs.

9. The method of claim 1, wherein a glow plug exchange (GPE) of all glow plugs is inferred from the time deviation of the measured value from the stored value of a sheathed-element glow plug.

10. The method of claim 1, wherein the inferring of the exchange of the glow plug is used for at least one of aging compensation and temperature regulation of sheathed-element glow plugs in a combustion engine.

11. The method of claim 1, wherein, to determine the deviation of the instantaneous value from the stored value, the amount-wise change in the values is related to an absolute value, and wherein the value for the at least one electric characteristic quantity is formed from a glow plug vector, which includes the at least one electric characteristic quantity.

12. The method of claim 11, wherein values of electric characteristic quantities are stored across driving cycles, and a glow plug exchange (GPE) is inferred from a discontinuity of the instantaneous value with respect to the stored value characteristic, and wherein temporal changes are derived from the stored values of electric characteristic quantities, and a glow plug exchange (GPE) is inferred from a discontinuity of an instantaneous value change and an historic change characteristic.

13. The method of claim 11, wherein the electric characteristic quantities include at least one of a cold resistance, a hot resistance, and a change in resistance, wherein a comparison of values of electric characteristic quantities takes place only if identical operating states of the combustion engine are present, and wherein the operating states include at least one of a cooling water temperature, an injection quantity, a rotational speed, and an energy loading of the sheathed-element glow plugs.

14. The method of claim 11, wherein a glow plug exchange (GPE) of all glow plugs is inferred from the time deviation of the measured value from the stored value of a sheathed-element glow plug, and wherein the inferring of the exchange of the glow plug is used for at least one of aging compensation and temperature regulation of sheathed-element glow plugs in a combustion engine.

15. The method of claim 11, wherein values of electric characteristic quantities are stored across driving cycles, and a glow plug exchange (GPE) is inferred from a discontinuity of the instantaneous value with respect to the stored value characteristic, wherein temporal changes are derived from the stored values of electric characteristic quantities, and a glow plug exchange (GPE) is inferred from a discontinuity of an instantaneous value change and an historic change characteristic, wherein the electric characteristic quantities include at least one of a cold resistance, a hot resistance, and a change in resistance, wherein a comparison of values of electric characteristic quantities takes place only if identical operating states of the combustion engine are present, and wherein the operating states include at least one of a cooling water temperature, an injection quantity, a rotational speed, and an energy loading of the sheathed-element glow plugs.

16. The method of claim 15, wherein a glow plug exchange (GPE) of all glow plugs is inferred from the time deviation of the measured value from the stored value of a sheathed-element glow plug, and wherein the inferring of the exchange of the glow plug is used for at least one of aging compensation and temperature regulation of sheathed-element glow plugs in a combustion engine.

17. The method of claim 1, wherein the time deviation is determined by an absolute amount of a difference between the instantaneous value and the stored value divided by a time difference from a time to determine the instantaneous value to a time to determine the stored value in the preceding cycle.

18. A device for detecting an exchange of sheathed-element glow plugs in a combustion engine, comprising:

a measuring unit for measuring at least one electric characteristic quantity of a sheathed-element glow plug;

a memory unit for storing at least one value of the at least one electric characteristic quantity; and a detection unit to determine an instantaneous value of the electric characteristic quantities of a glow plug, and to determine a time deviation of the at least one electric characteristic quantity by comparing the instantaneous value with at least one stored value of the same at least one electric characteristic quantity of the glow plug, the stored value having been determined at a start of at least one preceding driving cycle, and to detect a glow plug exchange (GPE) if the time deviation of the instantaneous value from the stored value exceeds a specifiable threshold value.

19. The device of claim 18, wherein the memory unit is configured to store values of electric characteristic quantities across driving cycles, and the detection unit is configured to detect a discontinuity of the instantaneous value with respect to the stored value characteristic, upon which a glow plug exchange (GPE) is detected.

20. The device of claim 19, wherein the detection unit is configured to derive variations over time from the stored values of electric characteristic quantities, and to detect a discontinuity of an instantaneous value change with respect to an historic change characteristic, upon which a glow plug exchange (GPE) is detected.

21. The device of claim 18, wherein the detection unit is configured to detect operating states of the combustion engine and to compare instantaneous values of electric characteristic quantities with stored values of electric characteristic quantities under identical operating states of the engine.

22. The device of claim 18, wherein the measuring unit, the memory unit, and the detection unit are one of (i) integrally arranged with one of an engine control unit and a sheathed-element glow plug control unit, and (ii) connected to one of the engine control unit and the sheathed-element glow plug control unit via an interface.

23. The device of claim 18, wherein the memory unit is configured to store values of electric characteristic quantities across driving cycles, and wherein the detection unit is configured to derive variations over time from the stored values of electric characteristic quantities, and to detect a discontinuity of an instantaneous value change with respect to an historic change characteristic, upon which a glow plug exchange (GPE) is detected.

24. The device of claim 18, wherein the detection unit is configured to detect operating states of the combustion engine and to compare instantaneous values of electric characteristic quantities with stored values of electric characteristic quantities under identical operating states of the engine, and wherein the measuring unit, the memory unit, and the detection unit are one of (i) integrally arranged with one of an engine control unit and a sheathed-element glow plug control unit, and (ii) connected to one of the engine control unit and the sheathed-element glow plug control unit via an interface.

25. The method of claim 18, wherein the time deviation is determined by an absolute amount of a difference between the instantaneous value and the stored value divided by a time difference from a time to determine the instantaneous value to a time to determine the stored value in the preceding cycle.

* * * * *